Patented Mar. 20, 1923.

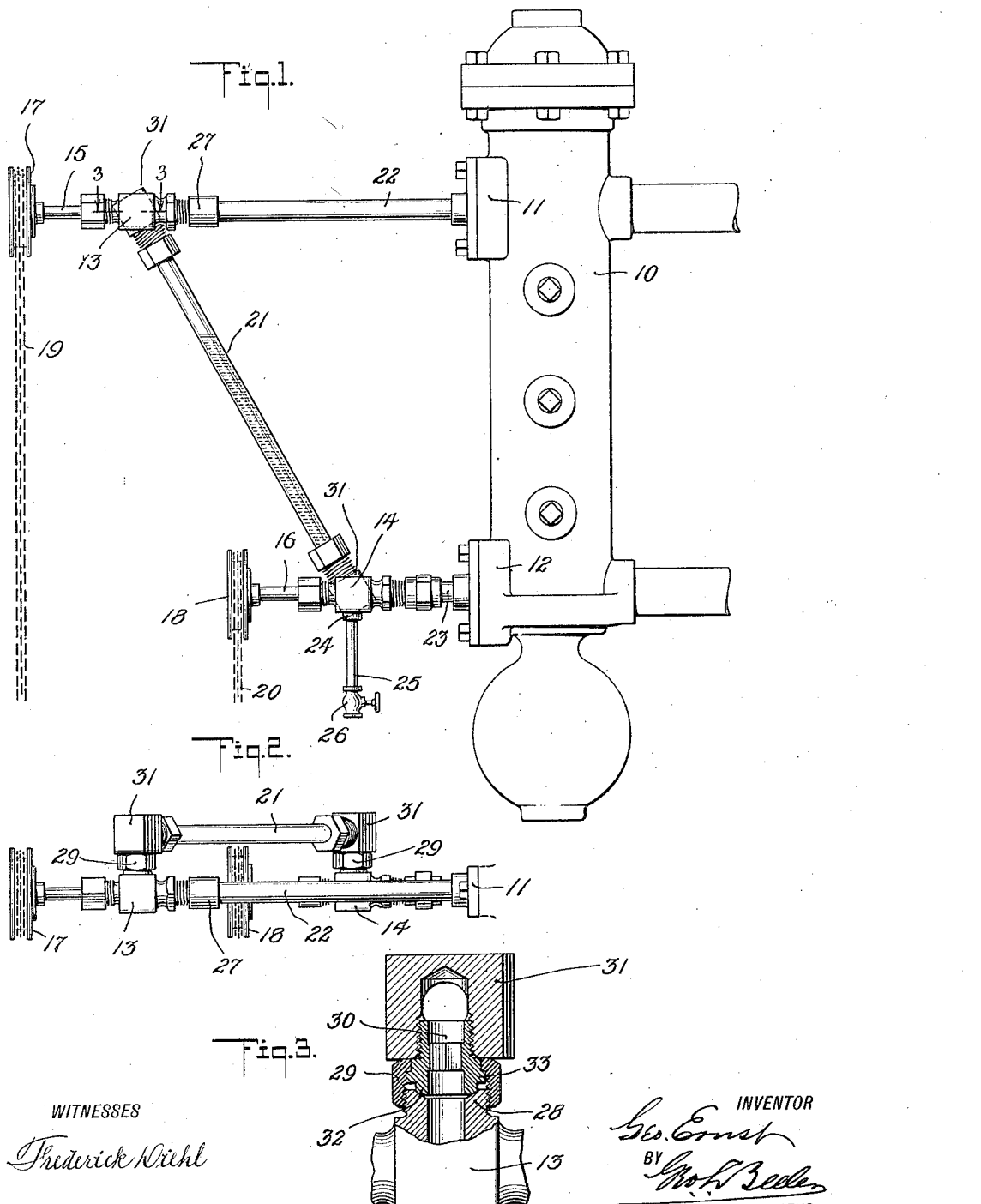

1,448,920

UNITED STATES PATENT OFFICE.

GEORGE ERNST, OF NEWARK, NEW JERSEY.

VARIABLE-ANGLE GAUGE GLASS.

Application filed May 7, 1921. Serial No. 467,681.

*To all whom it may concern:*

Be it known that I, GEORGE ERNST, a citizen of the United States, residing at Newark, in the county of Essex and State of New Jersey, have invented certain new and useful Improvements in Variable-Angle Gauge Glasses, of which the following is a specification.

This invention relates to gauge glasses for steam boilers or like apparatus, and has particular reference to gauge glasses for use in connection with steam boilers that are located or are extended far above the position of the operator and which under ordinary circumstances are exceedingly difficult of observation.

Among the objects of the invention, therefore is to provide a gauge glass of improved construction of such a nature as to make the reading and manipulation thereof relatively easy even though the glass itself may be located far above the operator's station.

More definitely stated, by this improvement I provide a gauge glass so inclined from the vertical or at an angle oblique to the side of the boiler as to make the water line in the glass clearly visible from directly below the glass as well as from any side thereof. In some installations the gauge glass is as high as forty feet above the floor or position of the operator and hence for a reading of the glass to be made it is necessary for the operator to stand far out from the vertical line of the boiler or at one side of the glass, and this is practically impossible when the same operator should be positioned practically directly below the glass in order to manipulate the valves for making such tests as are necessary. By this improved arrangement, however, the operator may read clearly the water level in the glass even though he is directly below it.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designated the same parts in the several views, and in which—

Figure 1 is a side elevation of a preferred embodiment of my improvement shown attached to a steam boiler water column.

Fig. 2 is a plan view of my improvement.

Fig. 3 is a horizontal sectional detail on the line 3—3 of Fig. 1.

When blowing down a gauge glass on a high boiler, under the usual old practice, it is necessary that while the water tender or operator opens the blow off valve, an assistant must watch the water in the glass from a position at a distance from the operator, for the latter when manipulating the blow off valve cannot see the gauge glass from his position when it is arranged in a vertical position, and if after opening the valve he walks far enough to see the position of the water, the principal feature or object of blowing down the glass is lost because he cannot observe under such conditions the action of the water whether it is quick or sluggish or how the water acts after he closes the valve.

Referring now more specifically to the drawings I indicate at 10 a water column which may typify diagrammatically any standard boiler structure to which a gauge glass is desired to be attached at the openings 11 and 12. 13 and 14 indicate the bodies of the upper and lower valves, which per se may be of any suitable construction, but shown herein as being provided with shut-off valve stems 15 and 16 which may if desired have multiple thread connections with the valve bodies for quick action, but which particular feature being old is not illustrated. To the valve stems are connected operating means of any desired nature such as sprocket wheels 17 and 18, respectively, for the accommodation of chains 19 and 20, which due to the arrangement of the gauge glass hang free and independent of each other, so that no obstruction or confusion as to their selection and manipulation can result.

The sight glass 21 is or may be similar to such glasses heretofore used except that it is cut longer than usual so as to maintain substantially the full vertical height of the gauge, and it may be protected in any suitable manner if desired.

To effect the desired inclination or obliquity of the glass with respect to the boiler connection I employ an extension piece 22 for one of the openings, preferably the upper one 11, while the connection at 23 is as short as may be conveniently connected to the other opening 12. Obviously this arrangement might be reversed if desired, although the manipulating means may ordinarily be more readily controlled when arranged as shown and so there is no interference between the chains or the like and the glass.

The lower valve body 14 is suitably tapped at 24 for the connection of the drain pipe 25 which may be of any suitable length and provided as usual at its lower end with a stop cock 26. Each of the valve bodies may be so tapped if desired for the purpose of varying the disposition of the sight glass on either the right or left side of the valves, the hole so tapped in the valve body remote from the drain pipe being closed with any suitable plug. The connection between the extended valve and the extension piece 22 is made by means of a coupling 27 of a rigid nature.

At one side of each valve body and entirely upon one side of the shut-off valve is formed a boss 28 having an external thread for a thimble 29 within which is a nipple 30 fixed rigidly in or made an integral part of the gauge head 31 into which one end of the sight glass is secured in any suitable manner. The nipple, boss, and thimble constitute a union, the axis of which is preferably perpendicular to the axis of the glass, but the glass may be adjusted at any desired position around the axis of the union. The nipple has a ground seat connection at 32 with the boss 28, and with the thimble embracing a flange 33 on the nipple a perfectly steam tight joint is made on the tightening of the thimble on the boss, irrespective of the position of the axis of the glass, and the manipulation of the union is effected wholly upon one side of each adjacent shut-off valve. Furthermore, there can be no danger of breaking of the glass during the adjustment or setting thereof.

From the specific description of the mechanism above set forth the manipulation and advantages thereof will be readily appreciated by those familiar with the usual difficulties in reading and manipulating gauge glasses high above the floor. The valves obviously may be closed and the gauge glass disconnected or interchanged whenever desired without disturbing the water level.

I claim:

1. In a gauge glass, the combination of a pair of spaced valve bodies, means to connect the valve bodies to a boiler, said connecting means comprising tubular members of unequal lengths located in the same plane, a shut-off valve arranged within each body and axially thereof, a sight glass, and means to attach the sight glass to the sides of the valve bodies, the means for attaching the sight glass comprising a union having its axis perpendicular to the plane aforesaid and located wholly upon one side of each body and shut-off valve and manipulatable entirely from said side thereof, said glass being inclined because of the disparity of lengths of the connecting members.

2. A device as set forth in claim 1 in which the unions for attaching the sight glass to the valve bodies provide for the attachment of the glass at any desired angle around the axes of the unions.

In testimony whereof I affix my signature.

GEORGE ERNST.